US005172296A

United States Patent [19]

Kaczmarek

[11] Patent Number: 5,172,296

[45] Date of Patent: Dec. 15, 1992

[54] SOLID STATE OVERVOLTAGE PROTECTOR ASSEMBLY

[75] Inventor: Richard T. Kaczmarek, Chicago, Ill.

[73] Assignee: Relaince Comm/Tec Corporation, Chicago, Ill.

[21] Appl. No.: 715,418

[22] Filed: Jun. 14, 1991

[51] Int. Cl.[5] .......... H02H 9/06

[52] U.S. Cl. .......... 361/119; 361/127

[58] Field of Search .......... 361/119, 118, 120, 124, 361/127

[56] References Cited

U.S. PATENT DOCUMENTS

| | | | |
|---|---|---|---|
| 3,743,888 | 7/1983 | Baumbach | 317/16 |
| 4,241,374 | 12/1980 | Gilberts | 361/124 |
| 4,939,619 | 7/1990 | Borkowicz et al. | 361/117 |
| 4,958,253 | 9/1990 | Gilberts | 361/119 |

*Primary Examiner*—Sharon D. Logan
*Assistant Examiner*—S. Jackson
*Attorney, Agent, or Firm*—Trexler, Bushnell, Giangiorgi & Blackstone

[57] ABSTRACT

A line protector for a communications circuit comprises a generally cup-shaped housing; and a generally disc-shaped solid state overvoltage arrester having electrodes formed at axially oppositely facing surfaces thereof for connection to a line circuit and a ground circuit respectively. An elongate contactor extends into the housing for contacting a first one of the electrodes and projects outwardly of the housing for contacting one of the line circuit and the ground circuit. An insulator member receives and positions the solid state overvoltage arrester with the other of the electrodes thereof in contact with a closed end of the cup-shaped housing and with the first electrode in position for contacting the contactor. An elastomeric member surroundingly engages the contactor and is surroundingly engaged by the cup-like housing for retaining the contactor, the insulator member and the overvoltage arrester in asembled condition within the housing.

8 Claims, 2 Drawing Sheets

SOLID STATE OVERVOLTAGE PROTECTOR ASSEMBLY

BACKGROUND OF THE INVENTION

This invention relates generally to improvements in line protectors of the type which protect telecommunications equipment from overvoltage or surge voltage conditions, and more particularly to a line protector which uses a solid state device as an overvoltage arrester.

Line or station protectors are used to provide telephone equipment with protection against voltage surges or overvoltages on the lines to which they are connected. Such protectors generally employ a surge arrester for each of the two wires, tip (T) and ring (R), in the telephone line to be protected.

In the recent past, an air-gap arrester has been used consisting of a pair of carbon electrodes which are held in a spaced-apart, facing condition across a small air gap. Upon the occurrence of an overvoltage or surge voltage on the protected line, the voltage causes arcing across the air gap and consequent grounding of the overvoltage condition. In this regard, one of the carbon electrodes is in circuit with ground and the other is in circuit with the line to be protected. One example of such an arrester (often referred to as a carbon arrester) is illustrated in U.S. Pat. No. 3,743,888 which is commonly assigned with the present invention.

Generally speaking, with carbon electrodes, a first electrode is generally a short, cylindrical or disc-shaped member which is of a similar outer diameter to the inner diameter of the cup-shaped housing member and is housed against the bottom or end wall thereof. The other electrode is a generally elongate, cylindrical rod-shaped member of lesser diameter which is, in turn, held within a generally tubular ceramic sleeve. The ceramic sleeve is generally of similar outer diameter to the first electrode and is placed within the housing to abut the outwardly facing surface of the first electrode. The sleeve holds the second electrode spaced apart from t-he first electrode to define an arc-gap of a desired length therebetween. Preferably the bottom of the cup and hence the first electrode is in electrically conductive contact with ground while the second rod-shaped electrode projects outwardly toward an open end of the cup-shaped housing to be placed in electrical circuit with the line to be protected.

A second or alternative type of surge arrester which has been used in station protectors in the recent past is a gas tube type of surge arrester. One example of a station protector which uses a gas tube type of overvoltage arrester is shown in U.S. Pat. No. 4,241,374, which patent is also commonly assigned with the present invention. As shown in the '374 patent a gas tube arrester assembly is placed inside of a conductive cap which is capable of being threaded into a well of a station protector block which holds multiple identical arresters. The gas tube member of the assembly is housed within a conductive cup or cup-like housing. The protector block is constructed for establishing a ground connection with the threaded conductive cap of the assembly. The gas tube is generally cylindrical in form having electrodes at its opposite axial ends. The electrode of the gas tube that is adjacent to the open end of the cup is in contact with a metallic contactor element which, in turn, is in contact with the line circuit to be protected. The other electrode of the gas tube is in contact with the cup-like housing which is in an electrically conductive circuit with the conductive cap and hence with ground. Preferably the assembly further includes an O-ring which fits over the gas tube and holds the same in place within the cup-like housing.

More recently, solid state devices have become available which are usable as overvoltage arresters in place of either gas tubes or carbon arc arresters to protect telecommunications equipment. Heretofore, these solid state devices were not available with the voltage ratings or power handling capabilities necessary for such use. However, with the availability of such solid state devices for this use, there has been increasing interest in replacing older gas tube or carbon elements with the newer solid state devices.

However, with literally millions of installations already in place in the field, it is further desirable to provide protective units which employ solid state overvoltage arresters and which can be used to replace existing line protector modules on a one-for-one or retrofit basis, interfitting with existing protector blocks and similar equipment. This avoids the much greater expense of physically removing and replacing complete installations. That is, protector elements in modular form should preferably be capable of being merely physically plugged into existing protector blocks or panels in existing installations. Hence it is desired to provide protector modules which are physically and electrically identical with existing protector modules, but which substitute solid state device type overvoltage arresters for the currently used carbon or gas tube type arresters.

The solid state arresters are believed to offer a number of advantages over either the carbon or gas tube type of arrestors currently in use. Such solid state arresters generally provide noise-free transmission, and have greatly reduced maintenance requirements and longer service life.

One example of such a line protector employing a solid state arrester is shown in U.S. Pat. No. 4,958,253, which is also commonly assigned with the present invention. This line protector preferably utilizes a thin, disc-like shape solid state of arrester element, which is generally of type shown in U.S. Pat. No. 4,939,619. The line protector shown and described in the '253 patent uses a solid conductive pedestal between one electrode of the arrester and the closed end of a cup or cup-like housing which contains the arrester. The closed end of the cup is in contact with the ground pin of a five-pin type of protector module.

It is desirable then to have a solid state surge arrester assembly which can be used in station protectors as a direct replacement for a gas tube or carbon type of surge arrester of the type referred to above. If this solid state assembly is a direct replacement for the presently used arrester, it can be retrofitted in existing station protector blocks or panels.

OBJECTS AND SUMMARY OF THE INVENTION

Accordingly, it is a general object of this invention to provide a station protector employing a solid state arrester which can be used as a direct replacement for presently used gas tube and carbon type arresters such that it can be retrofitted in existing station protector blocks or panels.

Briefly and in accordance with the foregoing object, a line protector for a communications circuit in accordance with the invention comprises a generally cup-shaped housing; a generally disc-shaped solid state overvoltage arrester having electrodes formed at axially oppositely facing surfaces thereof for connection to a line circuit and a ground circuit respectively; an elongate contactor extending into said housing for contacting one of said electrodes and projecting outwardly of said housing for contacting one of said ground circuit and said line circuit; an insulator member for receiving and positioning said solid state overvoltage arrester with the other of said electrodes thereof in contact with a closed end of said cup-shaped housing and with said one electrode in position for contacting said contactor; and an elastomeric member for surroundingly engaging said contactor and surroundingly engaged by said cup-like housing for retaining said contactor, said insulator member and said overvoltage arrester in assembled condition within said housing.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawings in which like reference numerals identify like elements, and in which:

DETAILED DESCRIPTION OF THE ILLUSTRATE EMBODIMENT

Figure 1:
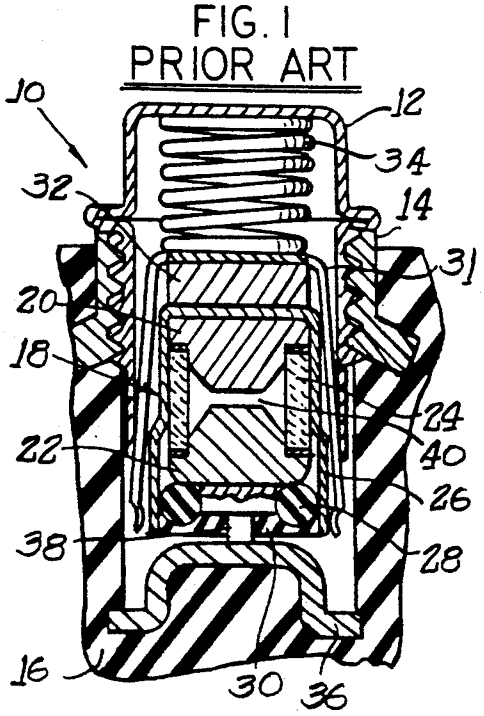
FIG. 1 PRIOR ART
FIG. 1 is an assembled view, partially in section, of a protector assembly employing a gas tube type of arrester in accordance with the prior art.

Referring now to the drawings and initially to FIG. 1, a prior art type of protector 10 is constructed in accordance with the teachings above-mentioned prior U.S. Pat. No. 4,241,374 to which reference is directed. Suffice it to say for purposes of the present description, that the protector 10 comprises a sheet metal housing or cap 12 which is in electrically conductive contact with a metal well 14 of a protector housing formed in a protector block 16 which may mount a plurality of such protectors. The metal contact portion 14 is preferably in electrical contact with ground such that the cap 12 and other components in electrical contact therewith will also be grounded.

Mounted within the cap 12 is a gas tube 18 having a pair of axially opposed electrodes 20, 22 coaxially mounted to a tubular insulator 24 of ceramic or the like. The gas tube 18 is in turn housed within a metallic cup or cup-like housing member 26. Near the open end of cup 26 an annular O-ring 28 is received, which O-ring is preferably formed of silicone rubber. An additional sealant or sealing compound 30 may also be disposed over the O-ring, if desired.

Metallic cup 26 is in turn coaxially housed within a metallic grounding cage 31 which also mounts a solder pellet 32 for fail/safe operation as is further described in the above-referenced '374 patent. A compression spring 34 completes the fail/safe arrangement. This arrangement is such that upon an overcurrent condition of sufficient magnitude to melt the solder pellet 32, the spring 34 will push the cage 31 into direct contact with a line contact portion 36 of the protector block 16, thus connecting the line to be protected directly to ground by way of the cage 31, spring 34, cap 12 and metal contact 14. In normal operation the line contact 36 is in electrically conductive contact with electrode 22 of the gas tube by way of an intermediate contact member 38 which extends outwardly of the sealed end of cup 26. The opposite electrode 20 of the gas tube will be seen to be an electrical contact with ground by way of closed end of cup 26, pellet 32, cage 31, spring 34, cap 12 and metal contact 14. Accordingly, in normal operation an overvoltage condition will be discharged to ground across an arc gap 40 which is defined between the spaced electrodes 20 and 22 of the gas tube 18.

Figure 2:
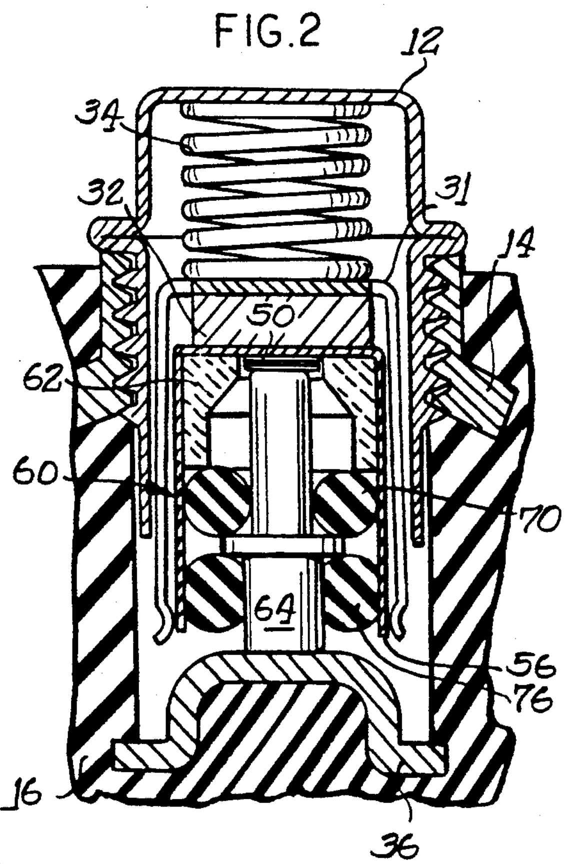
FIG. 2 is a partially sectioned assembled view showing a similar protector employing a solid state arrester element in accordance with the invention in place of the gas tube of FIG. 1 in the same type of protector assembly.
Figure 3:
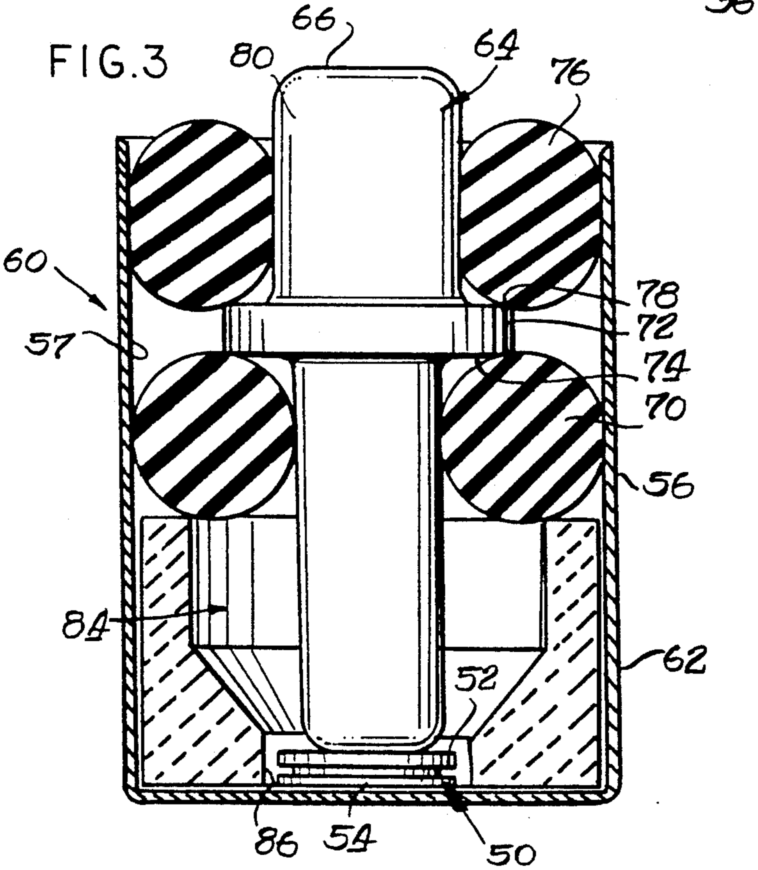
FIG. 3 is an enlarged view, partially in section, of an arrester assembly employing a solid state overvoltage arrester in accordance with the invention.
Figure 4:
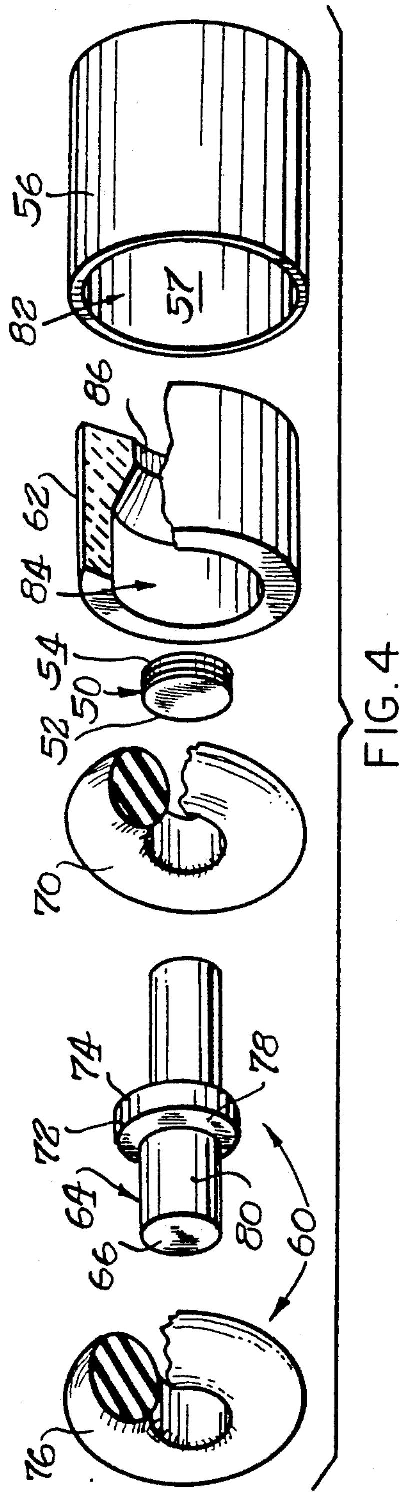
FIG. 4 is an exploded, perspective view of the assembly of FIG. 3.
Figure 5:
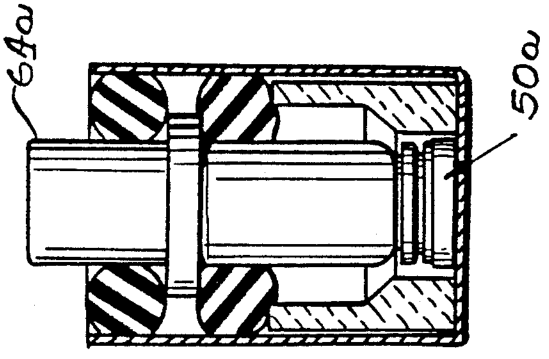
FIGS. 5–8 are assembled views, partially in section, similar to FIG. 3, showing respective alternate embodiments of the invention employing solid state arrester elements of a number of different shapes and sizes.
Figure 6:
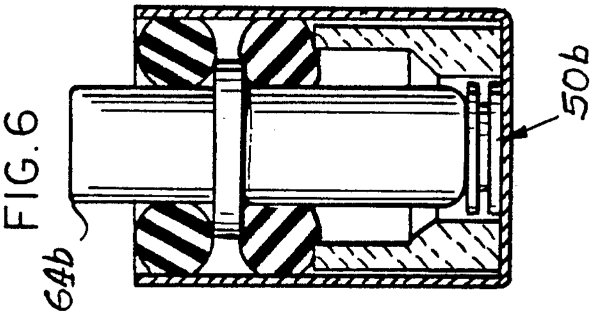
Figure 7:
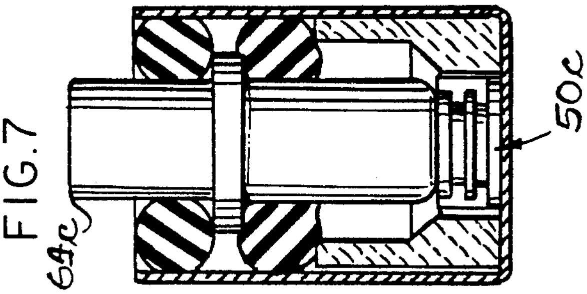
Figure 8:
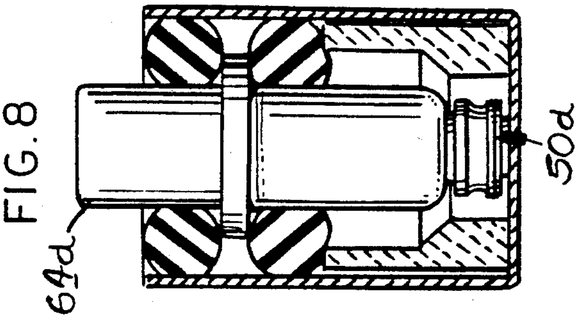

In accordance with the present invention and referring now to FIGS. 2 through 4, it is desired to replace the gas tube 18 on a one-for-one or retrofit basis with a solid state arrester device of suitable breakdown voltage. In the illustrated embodiment, and as best viewed in FIGS. 3 and 4, the solid state arrester is a thin, wafer-like semi conductor device which is housed or packaged within a generally disc-shaped body designated generally by the reference numeral 50. Accordingly, hereinafter the body or package 50 will be referred to as the thyristor or solid state arrester member. Hence, the thyristor 50 has a generally flat, disc-like configuration and presents axially oppositely facing conductive surfaces 52 and 54 which form electrodes for connection to a line circuit and a ground circuit respectively.

Referring more particularly to FIG. 2, it is desired to directly substitute or retrofit a thyristor or solid state arrester 50 configured as a relatively small, disc-like member as just described, into a protector assembly of the type illustrated and described above with reference to FIG. 1, and also in the above-referenced '374 patent. Accordingly, and referring to FIG. 2, a protector 10*a* as shown therein has like parts and components designated by the same reference numerals utilized hereinabove in describing the protector unit 10 of FIG. 1.

In accordance with the present invention, the gas tube surge arrester 18 is replaced by the thyristor 50. The cup or housing 26 is replaced by a similar cup or housing 56 of general similar external dimensions so that the same may be substituted therefor while maintaining the same fail/safe function as described above with reference to the solder pellet 32, cage 31 and spring 34. In the gas tube embodiment of FIG. 1, the cup 26 was flared somewhat to provide a secondary air gap relative to electrode 22; however, such a flared configuration is not required for cup 56. The cup or housing 56 is otherwise a generally cylindrical, cup-shaped member having one open end and one closed end for housing the other components of an arrester assembly designated generally by reference numeral 60 in FIG. 3 and including the cup or housing 56 itself, for retrofitting the thyristor 50 as the arrester component in place of the gas tube 18 of FIG. 1.

This assembly 60 includes an insulator member 62 for receiving and positioning the solid state overvoltage arrester 50 with its electrode 54 in contact with the closed end of the cup-shaped housing 56, and its other electrode 52 in position for contacting a contactor member 64. The contactor member 64 is an elongated body which extends into the housing 56 for contacting electrode 52 and projects outwardly of the housing at end 66 thereof for contacting one of the line circuit and the ground circuit. In FIG. 2, contactor 64 contacts the line circuit at line contact 36 of the protector illustrated; however, other protectors may have reversed ground/line contact arrangements.

The arrester assembly 60 in accordance with the invention further includes an elastomeric member 70 surroundingly engaging the contactor 64 and surroundingly engaged by the cup-shaped housing 56 for retaining the contactor 64, the insulator member 62 and the diode 50 in assembled condition and sealed within the housing 56.

In the illustrated embodiment, the elongated contactor 64 is generally cylindrical in form and has an increased diameter intermediate portion 72 which forms a first shoulder 74 for bearing against the elastomeric member 70 and for pressing the same against the insulator member 62 and in a direction generally into the housing 56. In this regard, the elastomeric member is generally annular in form and preferably toroidal or an O-ring as best viewed in FIG. 4. In practice, a silicone rubber O-ring similar to O-ring 28 used with the gas tube arrester of FIG. 1 may be utilized.

In accordance with the preferred embodiment illustrated herein a second elastomeric member 76 substantially similar to the member 70 is deformed into engagement with, and intermediate the contactor 64 and the cup-shaped housing 56. Cooperatively, the increased diameter portion 72 of the contactor forms a second oppositely facing shoulder portion 78 to receive and position the second elastomeric member 76 for sealing engagement with both the contactor 64 and the interior of the housing 56. Preferably in this regard, the diameter of the contactor 64 in that portion 80 thereof which projects from the second shoulder 78 is of somewhat larger diameter than the remaining portion thereof to cause a somewhat greater compression and hence sealing force with respect to the second elastomeric member 76. Preferably the elastomeric member 76 is also a silicone rubber O-ring and is substantially identical in configuration and size to the first elastomeric member 70.

Preferably, the inner diameters of the elastomeric members 70 and 72 are no greater than the outer diameter of the cylindrical contactor away from its increased diameter portion 72, and preferably increased diameter portion 80 is of greater diameter than the internal diameter of elastomeric member 76. The elastomeric members 70 and 76 preferably define outer diameters sized for sealing engagement against the internal surface 57 of the housing 56.

As best viewed in FIG. 4, the cup-shaped housing defines a generally cylindrical interior volume 82, and the insulator member 62 is generally tubular, having a cylindrical external surface generally of complimentary shape with a facing portion of internal surface 57 of the housing 56. In the embodiment illustrated, the insulator member 62 is preferably the same insulator member used in a carbon overvoltage arrester of the type discussed hereinabove and with reference to U.S. Pat. No. 3,743,888. In this regard, the tubular insulator member is preferably formed of ceramic material and has a through central bore 84, a first portion 86 of which defines an inner diameter sized for receiving and substantially centering the solid state arrester 50 relative to the cup-shaped housing 56. It should be appreciated, however, that any generally tubular insulator member having a through central bore which defines at least a portion for so receiving and positioning the thyristor 50 may be substituted for the insulator 62 just described.

In accordance with a preferred form of the invention, the contactor member 64 is formed of a brass material. It should further be noted that the combined axial height of the contactor 64 and the arrester 50 is such that an end portion 66 of the contactor will project outwardly of an open end of the cup-shaped housing 56.

Referring briefly to FIGS. 5 through 8, a number of alternative arrangements are illustrated for accommodating solid state arresters or thyristors of somewhat different external configurations and dimensions. These further embodiments differ primarily in the axial length of the contactor member 64 which is utilized in each instance. In all other respects, each of these embodiments is substantially identical to that described hereinabove with reference to FIGS. 2 through 4. Accordingly, the somewhat differently dimensioned contactor member as well as the somewhat differently configured thyristor or solid state arrester are designated in each of FIGS. 5 through 8 by the same reference numerals used hereinabove together with an additional letter suffix.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

I claim:

1. A line protector for a communications circuit comprising:

a generally cup-shaped housing;

a generally disc-shaped solid state overvoltage arrester having electrodes formed at axially oppositely facing surfaces thereof for connection to a line circuit and a ground circuit respectively;

an elongate contactor extending into said housing for contacting one of said electrodes and projecting outwardly of said housing for contacting one of said line circuit and said ground circuit;

an insulator member for receiving and positioning said solid state overvoltage arrester with the other of said electrodes thereof in contact with a closed end of said cup-shaped housing and with said one electrode in position for contacting said contactor;

and an elastomeric member for surroundingly engaging said contactor and surroundingly engaged by said cup-shaped housing for retaining said contactor, said insulator member and said overvoltage arrester in assembled condition within said housing;

wherein said elongate contactor is generally cylindrical in form, wherein said elastomeric member is generally annular and wherein said contactor has an increased diameter intermediate portion defining a first annular shoulder for bearing against said elastomeric member and for pressing the same against said insulator member generally in a direction into said cup-shaped housing and wherein said elastomeric member, said contactor and said housing are respectively sized to cause compressive sealing forces between the seating member and both the contactor and housing upon assembly thereof, for causing said solid state arrestor, said insulator and a portion of said contactor extending into the housing inwardly of said elastomeric member to be environmentally sealed without the use of any sealing compound.

2. A line protector according to claim 1 and further including a second elastomeric member substantially similar to said first elastomeric member and deformed into engagement intermediate said contactor and said cup-shaped housing for further sealing the same and holding the same together in assembled condition with said overvoltage arrester and said insulator member and said first elastomeric member.

3. A line protector according to claim 2 wherein said cup-shaped housing defines a generally cylindrical interior volume, wherein said insulator member is generally tubular, having a cylindrical external surface of generally complementary shape with a facing internal surface of said housing, wherein said elongate contactor is generally cylindrical having an increased diameter intermediate portion defining a first annular shoulder for bearing against said first elastomeric member and a second, oppositely facing annular shoulder for bearing against said second elastomeric member, said firs and second elastomeric members being generally annular in form and each defining an inner diameter no greater than the outer diameter of said cylindrical contactor away from said increased diameter portion and an outer diameter sized for sealing engagement against said internal surface of said housing.

4. A line protector according to claim 1 wherein said insulator member is formed of a ceramic material.

5. A line protector according to claim 2 wherein said first and second elastomeric members comprise silicone rubber O-rings.

6. A line protector according to claim 1 wherein said insulator members has a through central bore, at least a portion of which defines an inner diameter sized for receiving and substantially centering said solid state overvoltage arrester relative to said cup-shaped housing.

7. A line protector according to claim 1 wherein said contactor is formed of brass.

8. A line protector according to claim 1 wherein the axial height of said contactor and of said arrester combined is greater than the axial height of said cup-shaped housing, such that one end of said contactor projects outwardly of an open end of said cup-shaped housing.

* * * * *